United States Patent [19]

Braithwaite et al.

[11] 4,271,238

[45] Jun. 2, 1981

[54] STRUCTURAL MEMBERS FOR INSULATED VEHICLE BODIES

[75] Inventors: Albert A. Braithwaite, Blofield; Tony S. Smith, Neatishead, both of England

[73] Assignee: Freigh Bonallack Limited, Norfolk, England

[21] Appl. No.: 960,245

[22] Filed: Nov. 13, 1978

[30] Foreign Application Priority Data

Nov. 21, 1977 [GB] United Kingdom ............ 48464/77

[51] Int. Cl.³ ............... B62D 25/02; B62D 33/04
[52] U.S. Cl. ............... 428/542; 49/DIG. 1; 52/729; 52/730; 264/46.4; 264/46.7
[58] Field of Search ............ 52/309.7, 729, 730, 52/731, 732; 49/DIG. 1; 428/542, 313, 542; 156/77, 78; D25/74, 75; 264/46.4, 46.7

[56] References Cited

U.S. PATENT DOCUMENTS

| | | | |
|---|---|---|---|
| D. 225,988 | 1/1973 | Fischer | D25/75 X |
| 3,555,131 | 1/1971 | Weismann | 264/46.7 |
| 3,820,299 | 6/1974 | Verholt | 52/750 X |
| 4,058,909 | 11/1977 | Poleri | 35/16 |
| 4,069,631 | 1/1978 | Nahr | 49/DIG. 1 |

FOREIGN PATENT DOCUMENTS

| | | |
|---|---|---|
| 1140267 | 1/1969 | United Kingdom . |
| 1258030 | 12/1971 | United Kingdom . |

*Primary Examiner*—Henry F. Epstein
*Attorney, Agent, or Firm*—Hane, Roberts, Spiecens & Cohen

[57] ABSTRACT

A heat insulating pillar for use in constructing a heat insulating vehicle body comprises inner and outer metallic frame members joined by a plurality of relatively short load bearing plastic inserts. The inserts are encapsulated in a rigid polyurethane foam which is cured in situ and forms a bond with the frame members. The spacer members ensure sufficient mechanical strength for the pillar and in particular resist tension forces tending to separate the frame elements.

7 Claims, 1 Drawing Figure

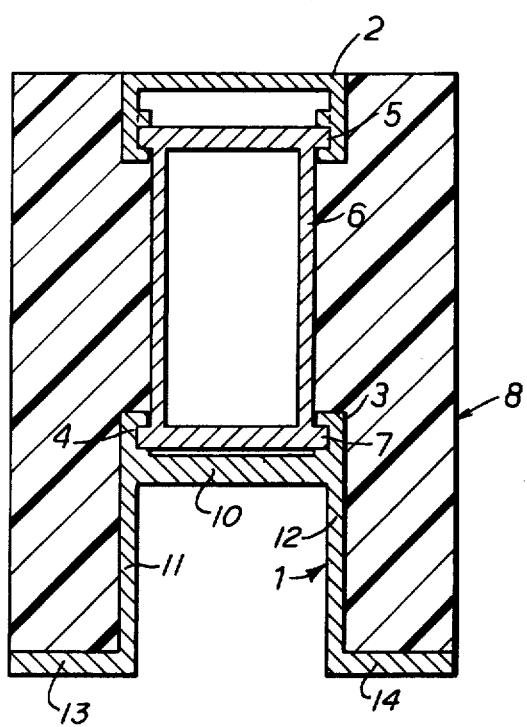

STRUCTURAL MEMBERS FOR INSULATED VEHICLE BODIES

FIELD OF THE INVENTION

This invention relates to a heat insulating structural member for use in constructing a heat insulating body for a commercial vehicle.

PRIOR ART

When reference is made to bodies for commercial vehicles it is intended to include not only bodies forming permanent parts of vehicles but also bodies which are adapted to be removably supported on a vehicle chassis.

In our British Pat. No. 1140267 there is described a body for a commercial vehicle, the body including a frame structure supporting heat insulating side walls, the frame structure comprising a plurality of spaced vertical pillars each formed from inner and outer frame elements of light alloy with a preformed non-hygroscopic heat insulating material between the frame elements and bonded to those elements. The side walls themselves included inner and outer wall panels of sheet material fitted between the vertical pillars, a space between the inner and outer wall panels being filled with heat insulating material in slab form. The non-hygroscopic heat insulating material between the frame elements had a compression strength greater than that of the heat insulating material between the inner and outer wall panels and provided a moisture barrier between the slabs.

In our British Pat. No. 1258030 there is described an improvement or modification of the construction of British Pat. No. 1140267, the modification or improvement comprising making the pillars of an inner and outer frame element and locating a core of polyurethane, cut to the appropriate dimensions from slabs, bonded to and located between the frame elements, the bonding being by liquid polyurethane.

It has been found that pillars constructed in accordance with the above suffer from various disadvantages. Firstly, cutting the core to appropriate dimensions from slab material is a time consuming and expensive process. Further, even though reasonable care is taken in cutting the core, variations in manufacturing tolerances mean that the surfaces of the core may not be in intimate contact with the frame elements over their entire surface area. As a result, bonding may not occur at full strength over the entire adjacent surfaces of the core member and the frame elements.

Further, whilst the pillars have been found to have excellent thermal insulating properties, the mechanical strength of the pillars is not sufficiently high to support high loads as would be imposed, for example, if an intermediate floor supported on the pillars were provided between the main floor of the vehicle body and the roof. A core formed from the material sufficiently strong to take account of all possible uses of the pillars would have an undesirably high thermal conductivity. Finally, it has been found that over a prolonged period of high loading, the vibrations to which pillars are subject in use tend to cause deterioration of the bond between the core and the frame elements, with a consequent further reduction in strength of the pillar member. This problem is particularly accute when load restraining means are fitted between the opposite side of the vehicle body intermediate the front and rear ends. If, for example, load restraining straps are fitted to retain a partial load, these are secured to opposite walls of the vehicle body and then tensioned. The tension forces tend to pull the inner frame members of the pillars towards each other, thereby exerting a force on each inner frame member tending to separate it frome its respective outer frame member.

SUMMARY OF THE INVENTION

According to the present invention there is provided a structural member for use in constructing an insulated body for a commerical vehicle, the member comprising: an inner metallic frame element; an outer metallic frame element; a plurality of rigid synthetic plastic spacer members each secured to each of the frame elements in load bearing relationship therewith; and a mass of in situ cured rigid load bearing foam surrounding the spacer members and bonded to the frame elements.

By "in situ cured" is meant that the foam has been shaped and positioned relative to the frame elements and spacer members in a fluid state, and has then set to a rigid state.

With such a structural member, which may be used as a wall pillar or as a roof or floor member, the rigid spacer members in load bearing relationship with the frame elements assist in transferring load between the frame elements and accordingly strengthen the structural member. Curing the foam in situ ensures intimate contact and bonding between the foam, the spacer members, and the frame elements. Accordingly, the composite structure is considerably stronger than the prior art structure described in the above specifications.

Further, the spacer members are preferably secured in a mechanical interfit relationship with the frame elements so that vibration forces, etc. tending to separate the frame elements are fully transferred between the frame elements by the spacer members. This ensures that the minimum tensile forces are required to be transmitted by the bond between the foam and the frame elements. This significantly reduces the load on the bond, and accordingly reduces the possiblity of bond failure.

Finally, the number, position, and spacing of the spacer members can be varied during manufacture of structural members according to the use to which the structural member is to be put. For example, a roof member required to support relatively light loads may be provided with relatively few spacer members, but a wall pillar may have relatively more spacer members. Further, the size and/or number of spacer members can be increased in regions of high stress in order to locally strengthen the structural member.

BRIEF DESCRIPTION OF THE DRAWING

The above and further features and advantages of the invention will become clear from the following description of a preferred embodiment thereof, given by way of example only, reference being had to the accompanying drawing the sole FIGURE of which shows a horizontal cross section through a wall pillar.

DETAILED DESCRIPTION

The pillar comprises two metallic elements 1,2 which in this embodiment are aluminium extrusions, the element 1 being in this case of top hat section the crown 10 of which lies between a pair of flanges 3,4 each having a groove in the face directed toward the other flange.

The element 1 has opposed webs 11, 12 and outwardly facing lower flanges 13,14. The element 2 is also in this embodiment an aluminium extrusion and in this instance is of channel section the opposed faces of the channel sides including grooves such as 5. In use, the element 1 is located on the exterior of a vehicle body, and the element 2 is located on the interior. The elements are provided with suitable apertures for fixing internal and external panelling between adjacent pillars. In a typical vehicle body the elements 1, 2 are elongated in length in a direction perpendicular to the cross-section in FIG. 1 and would be approximately 2.5 meters in length and would be suitably shaped at each end to be secured to the floor and roof respectively of the vehicle body.

The elements 1,2 are assembled to one another by means of box-shaped spacer members or inserts 6 of synthetic plastic material which in this instance are of generally rectangular constant section, open at each end and provided with a rib 7 at each corner the ribs engaging the grooves in the elements 1,2. The spacer members are rigid load bearing members and are formed of suitable plastic material, for example PVC (polyvinyl chloride). The exact load bearing characteristics of the spacer members will be determined by the desired mechanical strength of the pillar. However, it will be appreciated that for any particular cross section the strength of the individual spacer members will be directly related to the length of the spacer members, and accordingly the strength of the spacer members can be conveniently selected by varying the length of sections used.

The number and position of spacer members used will be determined by the desired characteristics of the finished pillar. For a pillar intended to do no more than support the roof of the vehicle body and to provide a fixing for the wall panels, up to 4 spacer members each of approximately 60 mm in length have been found satisfactory. The spacer members have a constant transverse cross-section and are cut from a length of material having said cross-section. For greater loads more and/or longer spacer members can be used, and in extreme cases a continuous spacer member extending along the entire length of the frame elements can be used. After assembly of the metallic frame elements and the plastic spacer members the assembly is placed in a jig (not shown) to form a cavity bounded by the frame elements and including the spacer members. The cavity is filled with a polyurethane foam and the foam permitted to cure. A suitable foam is a two part polyurethane material which foams in situ and after curing has a finished density of 32 kilograms per cubic meter.

The shape of the mould is such that the foam extends to approximately the line 8 shown in the drawings. The foam cures to a rigid state, and accordingly the composite structure formed in a rigid generally rectangular cross section pillar. The frame elements 1,2 are exposed at opposite surfaces of the pillar. The foam itself is non-hygroscopic, and accordingly forms a moisture barrier between adjacent panels of the finished vehicle body. To ensure that a vapour barrier is formed between adjacent panels of the finished vehicle the exposed surfaces of the foam are preferably coated with a water-proof bituminous compound. In order to assist release of the pillars from the mould, the mould may be lined with a suitable film material, for example, polythene, which film material is stripped from the completed pillars when they are removed from the mould.

Panelling and slabs of insulating material can be erected between pillars generally as described in our British Pat. No. 1140267.

It will be noted that during assembly of the frame elements with the spacer members, the spacer members are located in position by engaging the ribs 7 with the respective grooves in the frame elements at one end of the frame elements, and sliding the spacer members into position. After this has been done the flanges bounding the grooves on both sides of the spacer members may be crimped to prevent movement of the spacer members relative to the frame elements and thus provide a positive interfit between the frame elements and the spacer members.

We claim:

1. A structural load bearing member for use in constructing an insulated body for a commercial vehicle, said member comprising:
    an elongate inner metallic frame element having a first pair of laterally open grooves which face inwardly towards one another;
    an elongate outer metallic frame element having a second pair of laterally open grooves which face inwardly towards one another;
    a plurality of rigid synthetic plastic spacer elements extending between the inner and outer frame elements in load bearing relation therewith, each spacer element having a box-shaped transverse cross-section and being provided with a first pair of ribs engaging in a mechanical interfit relation with the first pair of laterally open grooves and a second pair of ribs engaging in a mechanical interfit relation with the second pair of laterally open grooves, the spacing of the ribs of each said pair of ribs being rigidly fixed by a respective wall of said box section; and a mass of in situ cured rigid load bearing foam completely embedding each spacer element therewithin and bonded to the frame elements in load bearing relation therewith.

2. A structural load bearing member according to claim 1 wherein said first pair of ribs comprise extensions of one wall of said box-shaped transverse cross-section and said second pair of ribs comprise extensions of a second wall of said box-shaped transverse cross-section.

3. A structural load bearing member according to claim 1 wherein said box-shaped transverse cross-section is rectangular.

4. A structural load bearing member according to claim 1 wherein said inner and outer frame elements have flanges bounding said grooves and said spacer elements are fixed in position by crimping at least some of said flanges adjacent each spacer element before said foam material is introduced.

5. A structural load bearing member according to claim 1 wherein said spacer elements have a constant transverse cross-section and are cut from a length of material having said cross-section.

6. A structural load bearing member according to claim 1 wherein said ribs face laterally outwards on said spacer element.

7. A structural load bearing member according to claim 1 wherein said frame elements are extrusions.

* * * * *